US005144884A

United States Patent [19]

Kelly

[11] Patent Number: 5,144,884

[45] Date of Patent: Sep. 8, 1992

[54] TWO-PART PISTON ASSEMBLY DEVICE

[75] Inventor: Eudell L. Kelly, Columbus, Ind.

[73] Assignee: Cummins Engine Company, Inc., Columbus, Ind.

[21] Appl. No.: 553,349

[22] Filed: Jul. 17, 1990

Related U.S. Application Data

[63] Continuation of Ser. No. 295,751, Jan. 11, 1989, abandoned.

[51] Int. Cl.[5] ........................... F01B 31/08; F16J 1/04

[52] U.S. Cl. ........................................ 92/186; 92/190; 92/216; 92/219; 123/193.6

[58] Field of Search ................. 92/186, 187, 189, 190, 92/220, 238, 255, 216, 219; 123/193 P

[56] References Cited

U.S. PATENT DOCUMENTS

| | | | |
|---|---|---|---|
| 1,088,510 | 2/1914 | Adams | 123/193 P |
| 1,491,155 | 4/1924 | McKone | 92/187 |
| 1,795,353 | 3/1931 | Taylor et al. | 92/190 |
| 2,315,403 | 3/1943 | Dillon | 92/190 |
| 2,964,364 | 12/1960 | Morgan . | |
| 3,189,010 | 6/1965 | Isley | 92/186 X |
| 3,971,355 | 7/1976 | Kottmann . | |
| 4,011,797 | 3/1977 | Cornet | 123/193 P |
| 4,056,044 | 11/1977 | Kamman et al. . | |
| 4,358,881 | 11/1982 | Mahrus et al. | 92/190 X |
| 4,662,319 | 5/1987 | Ayoul . | |

FOREIGN PATENT DOCUMENTS

| | | | |
|---|---|---|---|
| 2547626 | 12/1984 | France | 123/193 P |
| 2576639 | 8/1986 | France | 123/193 P |

*Primary Examiner*—Thomas E. Denion
*Attorney, Agent, or Firm*—Sixbey, Friedman, Leedom & Ferguson

[57] ABSTRACT

A piston assembly for use in a piston cylinder of an engine is disclosed. The piston assembly includes a piston rod which connects the piston assembly to a crankshaft. The piston rod has a pin receiving opening at an upper end. A piston head having a transverse bore is connected to the piston rod. A piston pin is disposed through the pin receiving opening of the piston rod and the transverse bore of the piston head. The piston pin connects the piston head to the piston rod and has an axial bore. A piston skirt is connected to the piston head. The piston skirt has a transverse bore and an oil reservoir formed in the upper surface. At least one piston skirt pin is disposed through the piston pin axial bore and the transverse bore of the piston skirt to connect the piston skirt to the piston pin. This connects the piston skirt to the piston head. A fastening device secures the piston skirt pin in position within the piston skirt and the piston pin. The distance between the top surface of the piston and the center line of the piston pin may be made shorter than the equivalent distance in a conventional piston head-piston skirt-piston pin assembly. Additionally, the weight of the piston assembly is less than the weight of a conventional piston head-piston skirt-piston pin assembly made from identical materials.

13 Claims, 4 Drawing Sheets

TWO-PART PISTON ASSEMBLY DEVICE

This application is a continuation of Ser. No. 07/295,751, filed Jan. 11, 1989, now abandoned.

TECHNICAL FIELD

The present invention relates to a piston assembly for a reciprocating engine. More particularly, the present invention relates to a multi-part piston assembly including pivotably connected head and skirt sections adapted for use in an internal combustion engine.

BACKGROUND OF THE INVENTION

Traditionally, the pistons adapted for use in an internal combustion engine have been of unitary construction made from cast iron or forged steel. As fuel economy has become a greater factor in engine design, attempts have been made to reduce engine weight. Some of these efforts have focused on redesigning the piston to reduce or eliminate portions which are unnecessary to the operational or structural requirements of the piston.

One early suggestion for reducing piston weight is disclosed in U.S. Pat. No. 2,964,364 to Morgan which discloses a design for a single piece piston. This design eliminates unnecessary structure from the pillar supports between which the connecting rod is pivotably connected to the piston by a piston pin. However, weight reduction by merely reducing the structural size of the piston is limited by practical concerns for maintaining reliability and adequate strength of the pistons.

For a variety of reasons, including the need to achieve further size and weight reduction, two part piston assemblies have been developed. One example of a reduced weight, two part piston is discussed in Ayoul, U.S. Pat. No. 4,662,319 wherein a piston assembly includes a high strength piston head formed of cast iron. The piston head is joined to a guiding skirt formed of lighter weight material.

Another approach to reducing weight by replacing the more conventional high density piston material with lighter metals such as high strength aluminum alloys is disclosed in U.S. Pat. No. 3,971,355 to Kottmann. Kottmann '355 discloses a piston pin assembly including a relatively short hollow truncated ovoid rod 6 and bolt 11 which connect piston head 2 to piston rod 7. Hollow rod 6 extends only between support members 4 and 5 which integrally depend from piston head 2. Bolt 11 extends through the hollow portion of rod 6 and beyond support members 4 and 5 to engage shank part 19 separate from piston head 2. Bolt 11 is narrow at its central portion where it connects piston head 2 to piston rod 7 and where it receives the combustion gas pressure exerted on piston head 2; yet bolt 11 is wider at its ends where it connects shank part 19 to the remainder of piston 1. Shank part 19 is rotatably connected to piston 1 via bolt 11 to form a pendulating piston assembly wherein shank part 19 guides the piston in the cylinder without being influenced by piston head 2.

While useful for the purposes disclosed, piston assemblies of the type disclosed by Kottmann '355 may compromise piston rod-piston assembly strength by eliminating the more conventional cylindrical piston pin configuration which allows the piston pin to be received in mating cylindrical apertures formed in piston head support members 4 and 5. For example, shoulders 20 and 21 of the Kottmann '355 pin 6 are inclined relative to the central axis of the piston assembly and thus tend to impose a radial force on support members 4 and 5 in response to combustion gas pressure. To resist such radial forces, peg-shaped piece 15 and sleeve 16 are provided at opposite ends of bolt 11. The relatively large diameter of peg-shaped piece 15 and sleeve 16 impose requirements for a correspondingly large diameter receiving apparatus in shank 19. These features therefore enlarge the overall size of the piston.

SUMMARY OF THE INVENTION

It is an object of the present invention to provide a reduced height and weight piston assembly which thereby reduces the overall engine weight and allows reduction in the cylinder height thereby reducing the overall engine block height.

It is another object of the present invention to provide a reduced height and weight piston assembly using a two part piston wherein a lighter weight metal composition is used for the piston skirt portion which reduces the piston weight and height to thereby reduce the overall engine weight, cylinder height, and engine block height.

It is another object of the present invention to provide a multi-part piston assembly including a head and an articulated skirt connected by a high strength connecting rod-piston head connection using a large diameter cylindrical piston pin extending entirely radially through support members depending from the piston head and a reduced diameter piston pin extension extending axially into the piston skirt.

It is another object of the present invention to provide a multi-part piston assembly in which the piston head and articulated piston skirt are connected by a multi-diameter piston pin having a large diameter high strength central portion and at least one reduced diameter end portion for pivotably connecting the piston skirt to the piston head while minimizing the overall piston assembly height.

It is another object of the present invention to provide a multi-part piston assembly according to the above objects while preserving the full annular oil reservoir in the upper portion of the piston skirt.

These and other objects are obtained by the piston assembly according to the present invention including a piston rod, a piston head connected to the piston rod, and a piston skirt connected to the piston head. The piston skirt has a transverse bore and an oil reservoir formed in the upper surface. A piston pin is disposed through a pin receiving opening of the piston rod and a transverse bore of the piston head to connect the piston head to the piston rod. At least one piston skirt pin is disposed through an axial bore formed in the piston pin and the transverse bore of the piston skirt to connect the piston skirt to the piston pin. Alternately, the piston skirt pin may be formed integrally with the piston pin. This connects the piston skirt to the piston head. A fastening device secures the piston skirt pin in position within the piston skirt and the piston pin. The distance between the top surface of the piston and the center line of the piston pin is shorter than the equivalent distance in a conventional piston head-piston skirt-piston pin assembly. Additionally, the weight of the piston assembly is less than the weight of a conventional piston head-piston skirt-piston pin assembly made from identical materials.

In one embodiment, the piston skirt pin extends completely through the piston pin axial bore. In this embodiment the fastening device includes a pair of snap rings. Each snap ring is disposed around a respective end of the piston skirt pin adjacent the piston skirt. In another embodiment two piston skirt pins are used. Each piston skirt pin is disposed in a respective end of the piston pin axial bore. In this embodiment the fastening device includes complementary threads formed on one end of each piston skirt pin and in the piston pin axial bore. Alternately, the fastening device includes forming each piston skirt pin of a slightly larger diameter than the piston pin axial bore. Each piston skirt pin is press fit into the piston pin axial bore.

Various additional advantages and features of novelty which characterize the invention are further pointed out in the claims that follow. However, for a better understanding of the invention and its advantages, reference should be made to the accompanying drawings and descriptive matte which illustrate and describe preferred embodiments of the invention.

BRIEF DESCRIPTION OF THE DRAWINGS

FIGS. 2*a* and 2*b* are side views, partially in cross section, of a comparison of piston assemblies wherein FIG. 2*a* is the piston assembly of FIG. 1 and FIG. 2*b* is a prior art two part piston.

DETAILED DESCRIPTION OF PREFERRED EMBODIMENTS

Figure 1:
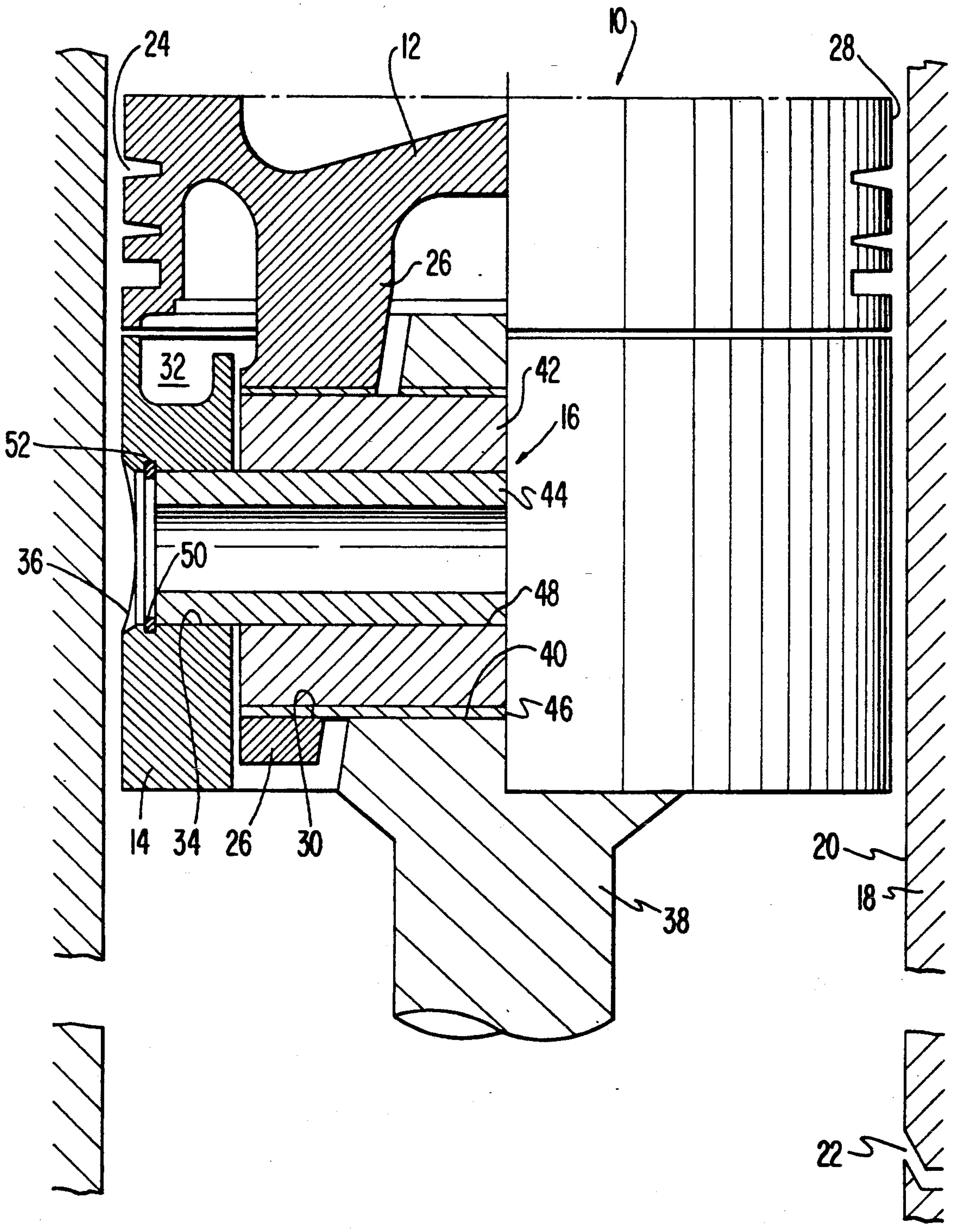
FIG. 1 is a side view, partially in cross section, of the piston assembly according to one embodiment of the present invention.

Referring first to FIG. 1, a piston assembly according to one embodiment of the invention is shown. Piston assembly 10 includes piston head 12, piston skirt 14, and piston pin assembly 16. Piston head 12 preferably is formed of cast iron or forged steel. Piston skirt 14 preferably is formed of a ligher weight material such as high strength aluminum alloys.

Piston assembly 10 is disposed within cylinder 18 having cylinder wall 20. Upwardly directed piston cooling nozzle 22 is fastened to the block structure and directs oil upwardly to cool piston assembly 10 during reciprocating movement. A secondary purpose of the oil from piston cooling nozzle 22 is to lubricate piston assembly 10.

Piston head 12 includes a plurality of annular grooves 24 formed around its upper portion to receive piston rings (not shown). Piston head 12 also includes depending portion 26 formed inwardly from outer wall 28 of piston head 12. Depending portion 26 may be annular and integrally incorporate support portions or it may include at least one but preferrably two separate support portions. A piston head transverse bore 30 extends totally through every support portion of depending portion 26 along an axis perpendicular to the central axis of the piston head 12. Transverse bore 30 thereby forms two opposing openings in annular portion 26.

Annular piston skirt 14 is disposed under piston head 12 and resides adjacent outer wall 28 of piston head 12. Piston skirt 14 includes oil reservoir 32 disposed in its upper surface. Oil reservoir 32 catches oil from oil spray outlet 22 for further upward splashing to cool piston head 12. Piston skirt 14 is also provided with piston skirt transverse bore 34 and skirt 14 may be provided with countersunk portion 36 surrounding the opening of transverse bore 34.

Piston rod 38 connects piston assembly 10 to the engine crankshaft (not shown). Piston rod 38 includes pin receiving opening 40 at its upper end. The upper end of piston rod 38 is disposed within piston assembly 10 and is connected to piston head 12 by piston pin assembly 16.

Piston pin assembly 16 is disposed within piston head transverse bore 30 and pin receiving opening 40 of piston rod 38 to connect piston head 12 to piston rod 38. Piston pin assembly 16 includes piston pin 42 and piston skirt pin 44. Piston pin 42 is disposed within transverse bore 30 and piston pin opening 40. Bushing 46 is disposed around piston pin 42 adjacent transverse bore 30 and piston pin opening 40. Alternately, two separate bushings 46 may be used. Piston pin 42 has axial bore 48 which receives piston skirt pin 44. Piston skirt pin 44 is disposed within axial bore 48 at one portion and within piston skirt transverse bore 34 at another portion, and is formed hollow to further reduce the weight of piston assembly 10. As shown in FIG. 1 only one piston skirt pin 44 is used: piston skirt pin 44 extends completely through piston assembly 10. Each end of piston skirt pin 44 is disposed within transverse bore 34. The central portion of piston skirt pin 44 is disposed within axial bore 48 of piston pin 42. In this embodiment, transverse bore 34 forms two opposing openings in piston skirt 14. Piston skirt pin 44 is secured within transverse bore 34 of piston skirt 14 by snap ring 50 disposed around each end of piston skirt pin 44. The outside of snap ring 50 resides within groove 52 in piston skirt 14.

Figure 2B:
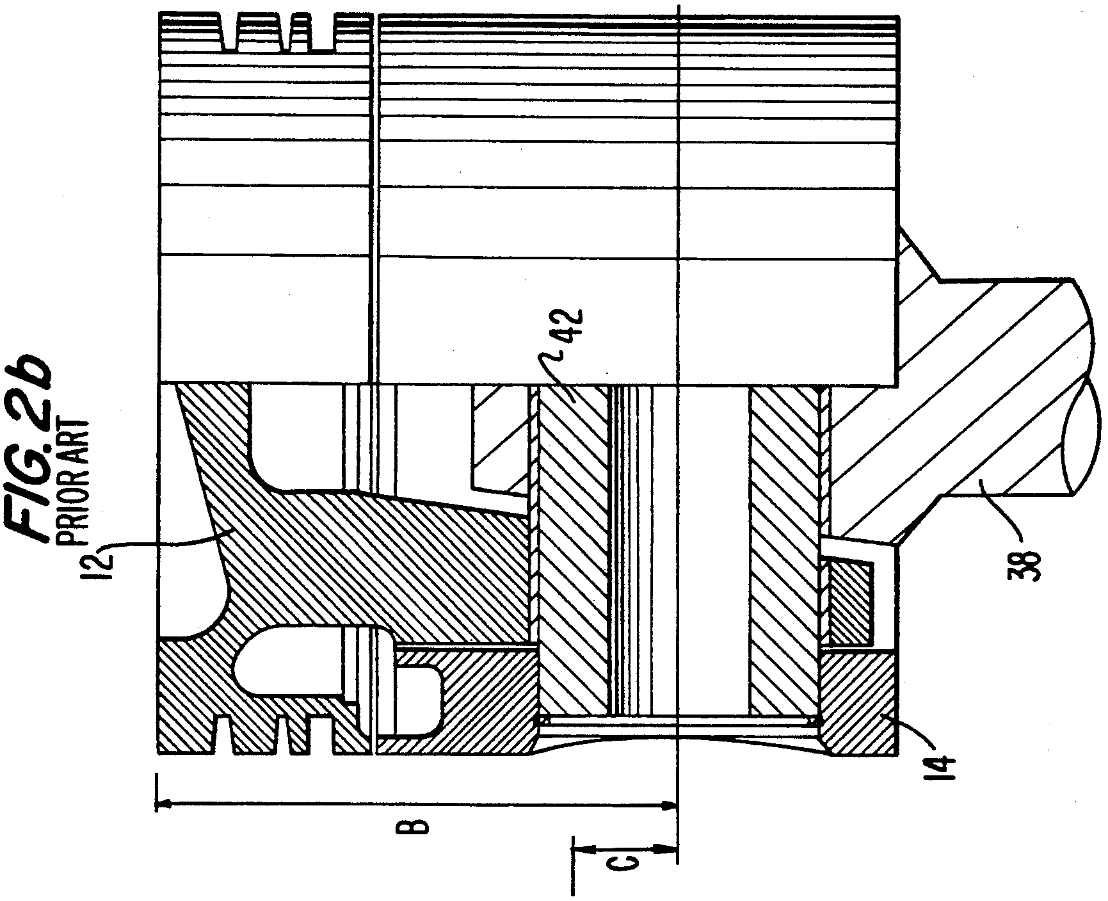
FIG. 2b PRIOR ART
Figure 2A:
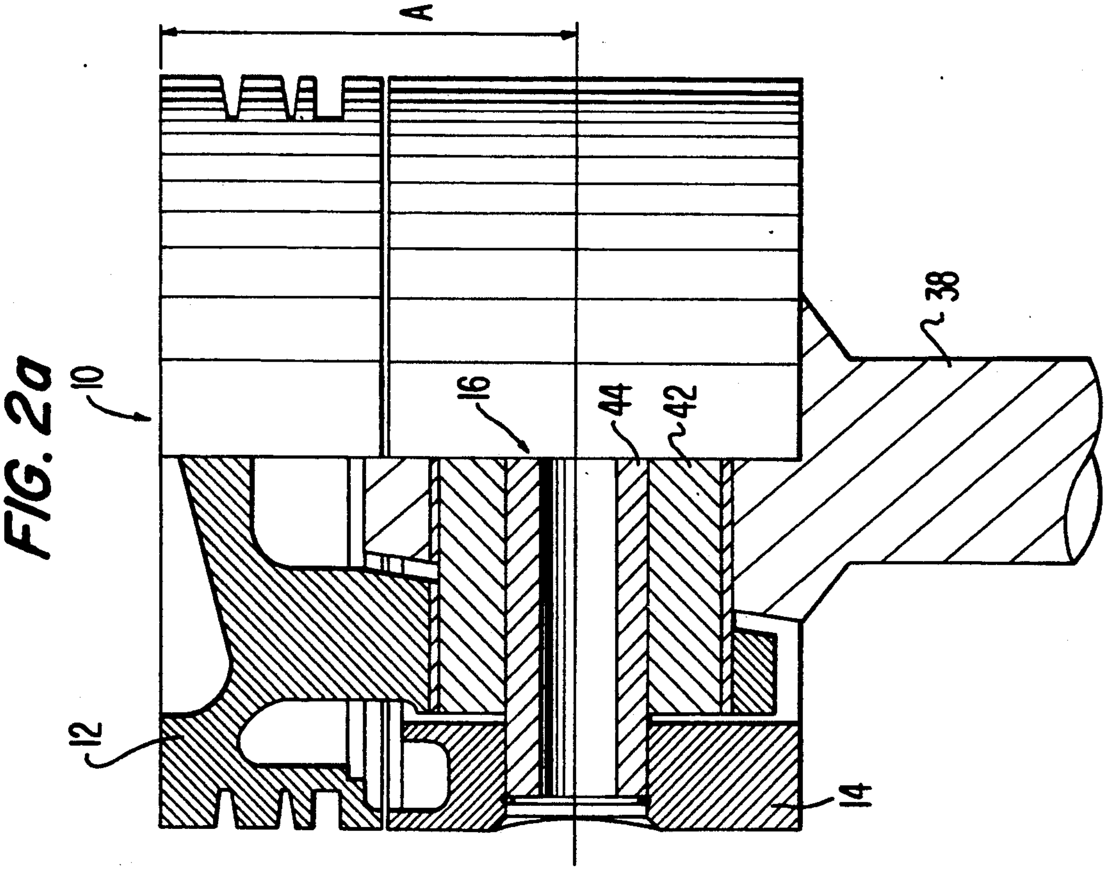

FIGS. 2*a* and 2*b* present a comparison of the piston assembly 10 of FIG. 1 (FIG. 2*a*) with a typical conventional two part piston (FIG. 2*b*) having similar operating characteristics. As shown, distance A is the distance from the top of the piston head to the centerline of the piston pin in piston assembly 10 of the present invention. Distance B is the distance from the top of the piston head to the centerline of the piston pin in the prior art two part piston. Distance C is the difference between distance B and distance A. A typical distance B is 102.35 mm. Using the present invention, distance A is 81.50 mm. The difference, distance C, is 20.85 mm. Thus, using the present invention, the distance from the top of the piston head to the centerline of the piston pin is reduced by over 20% as compared with prior two part pistons. The reduced height of the piston assembly of the present invention enables the cylinders to be similarly shortened to reduce the overall dimensions of the entire engine. Additionally, the reduction in height is accompanied by a reduction in weight of the piston assembly as well as the cylinders. Thus, the overall weight of the engine is reduced. As is well known, reducing the size and weight of an engine without compromising its efficiency or effectiveness is highly desirable, especially in over-the-road vehicle engines. The piston assembly of the present invention achieves this elusive goal. Moreover, the use of the oil reservoir to cool and lubricate the piston assembly is maintained.

Figure 3:
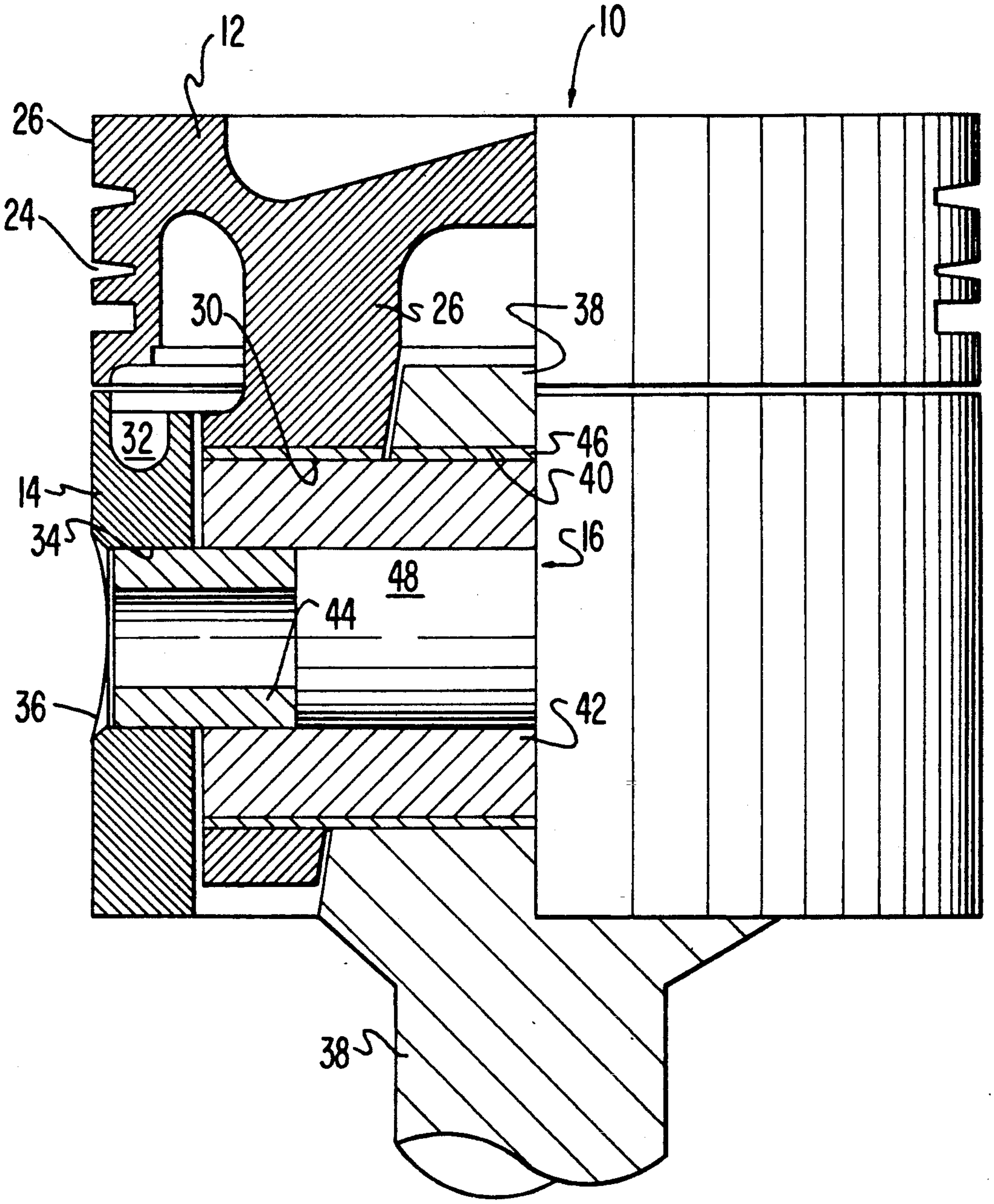
FIG. 3 is a side view, partially in cross section, of the piston assembly according to another embodiment of the present invention.
Figure 4:
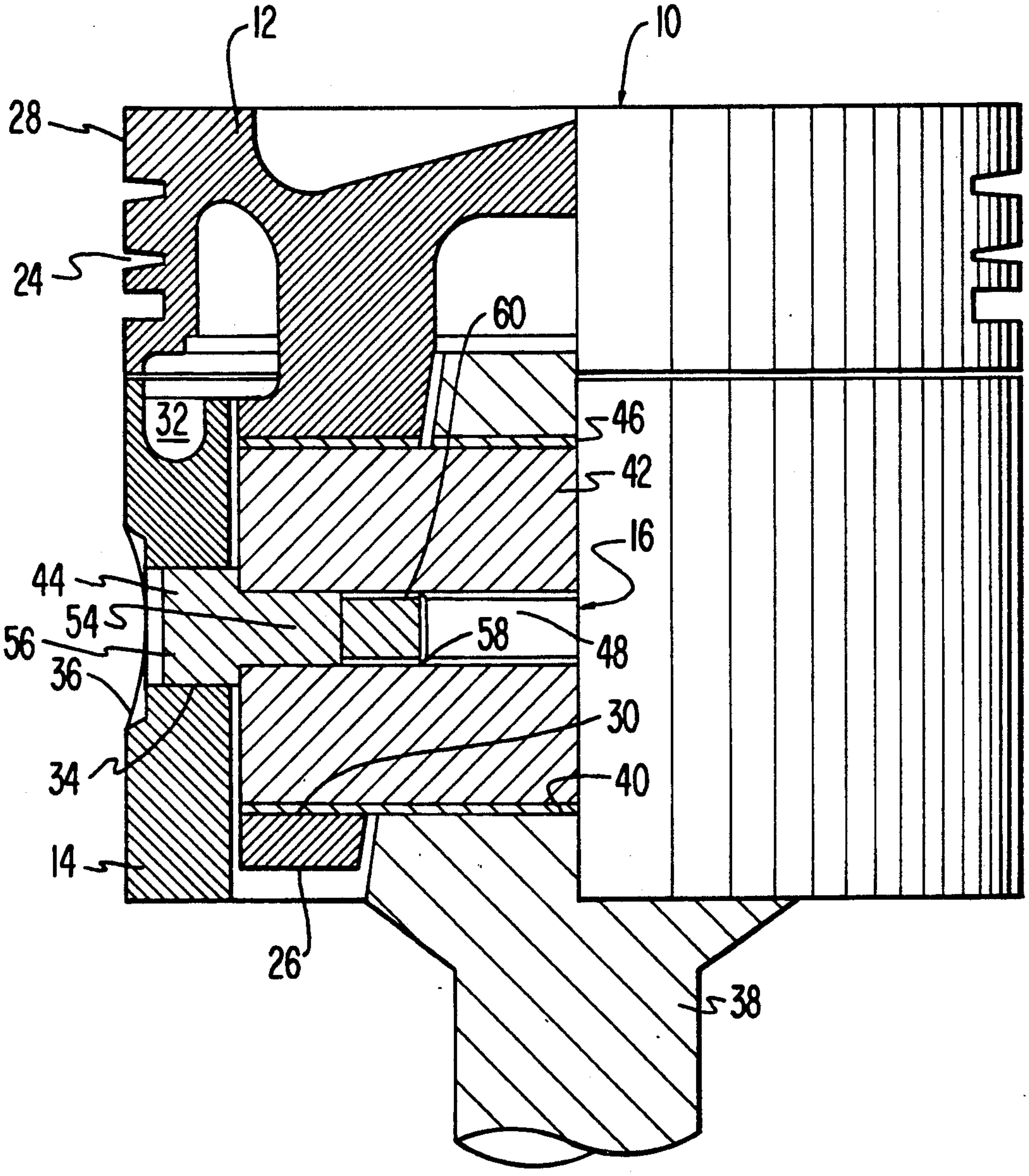
FIG. 4 is a side view, partially in cross section, of the piston assembly according to another embodiment of the present invention.

Two alternate embodiments of piston pin assembly 16 of the piston assembly invention are shown in FIGS. 3 and 4. In the embodiment of FIG. 3, two piston skirt pins 44 are used, one in each end of axial bore 48 of piston pin 42. Alternately, only one piston skirt pin 44 may be used although this compromises the piston-piston rod connection. In this embodiment, piston skirt pins 44 each are formed having an outer diameter and circumference slightly larger than those of axial bore 48. Piston skirt pins 44 are press fit into axial bore 48. Snap ring 50 is not used.

In the embodiment of FIG. 4, two piston skirt pins 44 are used. Alternately, only one piston skirt pin 44 disposed in one end of piston pin axial bore 48 may be used although this compromises the piston-piston rod connection. Piston skirt pins each include body portion 54, head portion 56, and threaded portion 58. Piston skirt pin 44 is threaded into threads 60 formed in axial bore 48.

INDUSTRIAL APPLICABLITY

The piston assembly of the present invention performs the reciprocating piston functions while having reduced dimensions and reduced weight. The piston assembly finds application with internal combustion engines. This design is particularly suitable for engines used with truck and automotive vehicles as well as stationary power plants, where engine size and weight are critical considerations.

Numerous characteristics, advantages, and embodiments of the invention have been described in detail in the foregoing description with reference to the accompanying drawings. However, the disclosure is illustrative only and the invention is not limited to the precise illustrated embodiments. Various changes and modifications may be effected therein by one skilled in the art without departing from the scope or spirit of the invention.

I claim:

1. A piston assembly for use in a cylinder of a reciprocating expansible chamber device having a crankshaft and a piston rod connecting said piston assembly to the crankshaft, the piston rod having a pin receiving opening at an upper end, said piston assembly comprising:

a piston head having an upper wall, a depending outer wall and a pair of support portions depending from said upper wall and spaced inwardly from said outer wall, said support portions containing a pair of transverse bores adapted to be aligned with the pin receiving opening of the piston rod;

a piston pin having an outer cylindrical surface with a predetermined diameter, said piston pin being disposed through the pin receiving opening of the piston rod and said transverse bores of said piston head to connect said piston head to the piston rod;

a piston skirt having oil means for retaining lubrication oil supplied to said piston assembly for cooling and lubricating the piston assembly, said oil retaining means including a substantially annular oil reservoir having an oil retaining portion formed in the upper surface of said piston skirt for retaining oil during an upward stroke of said piston assembly and for discharging oil for splashing against the underside of said upper wall when said piston assembly reverses direction and commences a downward stroke; and attaching means for connecting said piston skirt to said piston pin in a predetermined fixed axial location, said attaching means including a pair of axial extensions located at opposite ends of said piston pin and oriented in the direction of the central axis of said piston pin, each of said extensions having a radial extent, relative to the central axis of said piston pin which is less than said predetermined diameter of said cylindrical surface of said piston pin, said attaching means engaging said piston pin at locations which position said oil reservoir relative to said piston pin so that a geometrical extension of said cylindrical surface of said piston pin would intersect said oil retaining portion of said oil reservoir.

2. A piston assembly according to claim 1 wherein said piston skirt has a pair of aligned transverse bores for receiving said axial extensions of said piston pin.

3. A piston assembly according to claim 2 wherein said axial extensions are separate from said piston pin.

4. A piston assembly according to claim 1 wherein said piston pin has an axial bore coaxial with said piston skirt transverse bores, and wherein each said axial extension comprises an end of at least one piston skirt pin disposed through said piston pin axial bore and said transverse bore of said piston skirt.

5. A piston assembly according to claim 4 wherein said piston skirt pin is hollow.

6. A piston assembly according to claim 4 further comprising fastening means for securing said piston skirt pin in position within said piston skirt and said piston pin.

7. A piston assembly according to claim 6 wherein said piston skirt pin is hollow.

8. A piston assembly according to claim 6 wherein said fastening means comprises a snap ring, said snap ring being disposed adjacent the end of said piston skirt pin adjacent said piston skirt.

9. A piston assembly according to claim 6 wherein said piston skirt pin extends completely through said piston pin axial bore.

10. A piston assembly according to claim 9 wherein said fastening means comprises a pair of snap rings, each said snap ring being disposed adjacent a respective end of said piston skirt pin adjacent said piston skirt.

11. A piston assembly according to claim 6 comprising two piston skirt pins each being disposed in a respective end of said piston pin axial bore.

12. A piston assembly according to claim 11 wherein said fastening means comprises complementary threads formed on one end of each said piston skirt pin and in said piston pin axial bore.

13. A piston assembly according to claim 11 wherein said fastening means comprises forming each said piston skirt pin of a slightly larger diameter than said piston pin axial bore to press fit each said piston skirt pin within said piston pin axial bore.

* * * * *